United States Patent [19]

Rowe

[11] Patent Number: 5,443,762
[45] Date of Patent: * Aug. 22, 1995

[54] SOLVENT MIXTURES HAVING ENHANCED EVAPORATION

[75] Inventor: Edward A. Rowe, Grand Island, N.Y.

[73] Assignee: Occidental Chemical Corporation, Niagara Falls, N.Y.

[*] Notice: The portion of the term of this patent subsequent to Aug. 31, 2010 has been disclaimed.

[21] Appl. No.: 96,250

[22] Filed: Jul. 26, 1993

Related U.S. Application Data

[63] Continuation-in-part of Ser. No. 844,061, Mar. 2, 1992, Pat. No. 5,240,641.

[51] Int. Cl.$^6$ .............................................. C23G 5/028
[52] U.S. Cl. .................................... 252/364; 134/10; 106/287.28; 106/311
[58] Field of Search ......................... 252/364; 106/311

[56] References Cited

U.S. PATENT DOCUMENTS 3,839,087 10/1974 Beckers .................... 260/625.5 R X
4,578,209 3/1986 Hisamoto et al. ................... 252/143

Primary Examiner—Gary Geist
Attorney, Agent, or Firm—Wayne A. Jones; Richard D. Fuerle

[57] ABSTRACT

Disclosed is a mixture of about 10 to about 60 volume percent monochlorobenzotrifluoride, about 10 to about 60 volume percent monochlorotoluene, and about 20 to about 60 volume percent perchloroethylene. Also disclosed is a mixture of about 10 to about 30 volume percent monochlorobenzotrifluoride, about 40 to about 60 volume percent monochlorotoluene, and about 30 to about 50 volume percent perchloroethylene. The mixtures are used as solvents to form coatings of organic polymers and to clean parts.

16 Claims, 4 Drawing Sheets

SOLVENT MIXTURES HAVING ENHANCED EVAPORATION

BACKGROUND OF INVENTION

This application is a continuation-in-part of application Ser. No. 07/844,061, filed Mar. 2, 1992 now U.S. Pat. No. 5,240,641.

This invention relates to solvent mixtures. In particular, it relates to mixtures of monochlorotoluene, monochlorobenzotrifluoride and perchloroethylene.

1,1,1-trichloroethane has been a widely used solvent in many industries because it is nonflammable, dissolves most soluble polymers, and evaporates quickly. However, it has been found to deplete the ozone layer in the stratosphere. Regulations now limit its use and it may soon be prohibited entirely for many applications. Users of 1,1,1-trichloroethane are presently searching for substitute solvents with the same desirable properties, but which will not attack the ozone layer.

SUMMARY OF THE INVENTION

I have discovered that certain mixtures of monochlorotoluene, monochlorobenzotrifluoride and perchloroethylene (PERC) have almost the same desirable properties that 1,1,1-trichloroethane has, but are not expected to attack the ozone layer. Because about two years are required for a solvent released on the ground to reach the ozone layer in the stratosphere, and the solvents used in this invention have an atmospheric life in the troposphere of only about sixty days, they should not be ozone depleters. The solvent formulations of this invention are good solvents for most organic polymers, evaporate rapidly and are nonflammable.

Very unexpectedly, I have discovered that even though parachlorobenzotrifluoride (PCBTF) evaporates only about half as fast as PERC, nevertheless mixtures of PCBTF with orthochlorotoluene (OCT) evaporate faster than do mixtures of PERC with OCT. That is, if the volume percent of OCT in a mixture is kept constant, the evaporation rate decreases as the PCBTF is replaced by PERC, even though PERC evaporates faster than PCBTF! As yet, I have found no explanation for this unusual phenomena.

DESCRIPTION OF THE PREFERRED EMBODIMENTS

Figure 1:
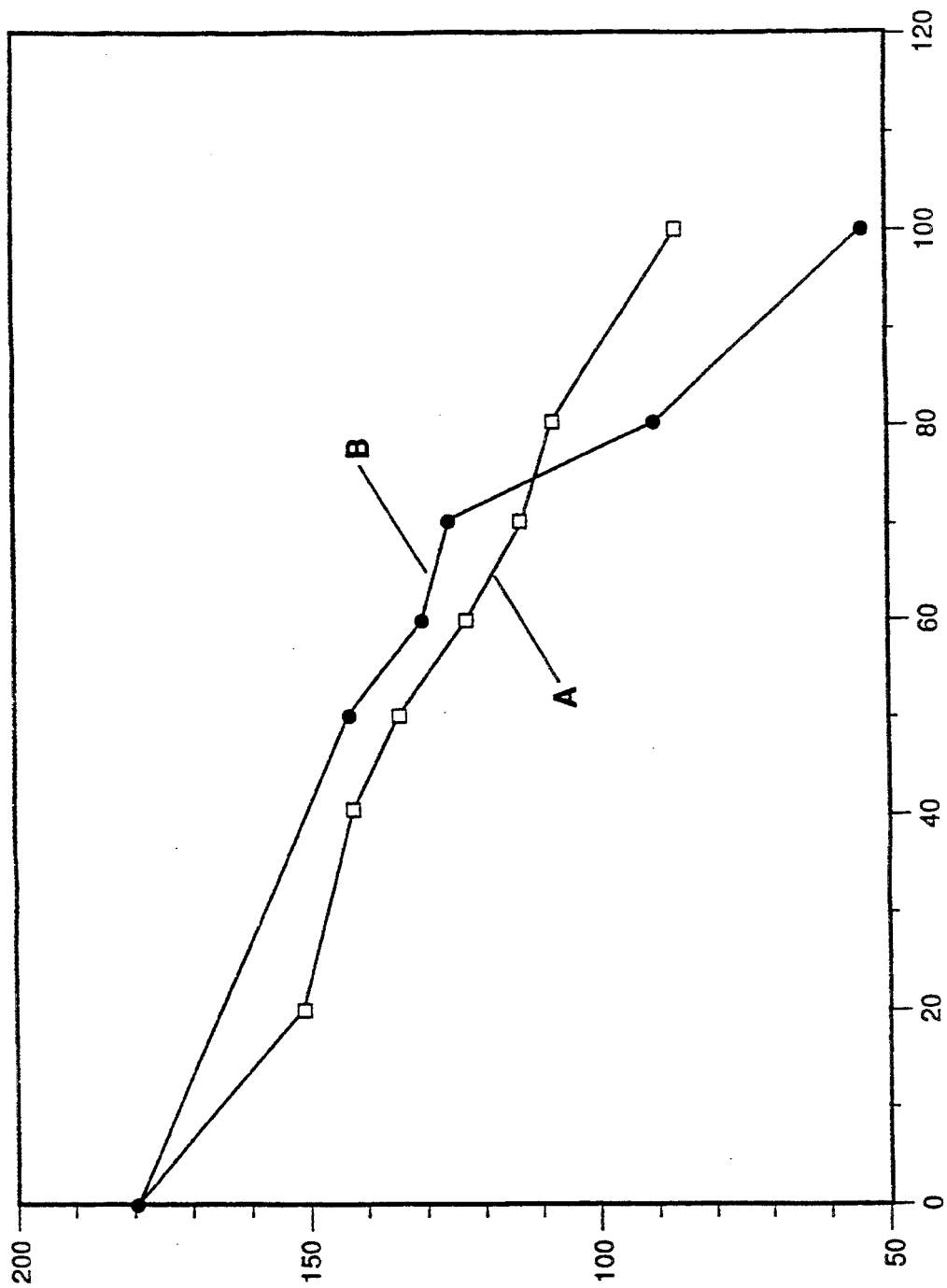
FIG. 1 is a graph where the abscissa is the volume percent of PCBTF (line A) or PERC (line B) mixed with OCT and the ordinate is the evaporation time in seconds.

This invention is for a mixture of solvents, where the mixture includes monochlorotoluene, monochlorobenzotrifluoride, and perchloroethylene, but does not include any substances that could adversely affect the useful properties of the invention, such as insoluble compounds (e.g., tetrafluoropropanol) or compounds that are insoluble or corrosive (e.g., benzoic acid or dodecyl benzene sulfonic acid). The solvents used in the mixtures of this invention are available and can be purchased. Monochlorotoluene has the general formula

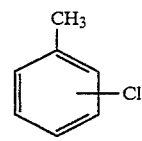

and monochlorobenzotrifluoride has the general formula

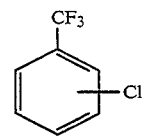

Of the three monochlorotoluene isomers—ortho, meta, and parachlorotoluene, orthochlorotoluene (OCT) is preferred because it is the least expensive. Of the three monochlorobenzotrifluoride isomers, parachlorobenzotrifluoride (PCBTF) is preferred because it is commercially available. Orthochlorobenzotrifluoride and metachlorobenzotrifluoride can be used, but metachlorobenzotrifluoride is the least desirable because it is too expensive. This invention contemplates a mixture of about 10 to about 60 volume % monochlorobenzotrifluoride, about 10 to about 60 volume % monochlorotoluene and about 20 to about 60 volume % PERC. In that mixture, the total volume percent of monochlorotoluene and monochlorobenzotrifluoride must be less than 70 volume percent in order for the mixture to be nonflammable (i.e., at least 30 volume % PERC is needed for nonflammability). If the mixture is to be used in applications that require good solvency for organic polymers, it is preferable to use about 10 to about 30 volume percent monochlorobenzotrifluoride, about 40 to about 60 volume percent monochlorotoluene and about 30 to about 50 volume percent PERC. Another preferred mixture is about 20 to about 50 volume % monochlorobenzotrifluoride, about 30 to about 60 volume % monochlorotoluene and about 20 to about 50 volume % PERC. Two particularly preferred compositions are 30 volume % PCBTF, 20 volume % OCT and 50 volume % PERC because it is non-flammable and evaporates fast, and 20 volume % PCBTF, 50 volume % OCT and 30 volume % PERC, because it contains as little PERC as possible for non-flammability.

The solvent mixtures of this invention can include various other optional components that do not adversely affect its properties. About 0.01 to about 1.0 wt % of a stabilizer can be included in the mixture to trap decomposition products that may catalyze the decomposition of the components of the mixture. Stabilizers include compounds such as epoxides, glycidyl ethers, and diepoxides. The preferred stabilizer is allyl glycidyl ether because it is available and its boiling point is close to the boiling point of the solvent mixture.

About 0.0005 to about 0.1 wt % of an antioxidant can be included in the solvent mixtures to act as a free radical inhibitor by scavenging free radicals such as monoatomic oxygen. Examples of antioxidants include hindered phenols such as thymol, hydroquinone monomethyl ether, and tertiary amyl phenol. Other examples of antioxidants include nitrogen ring compounds such as N-methyl pyrolle. Hindered phenols are preferred due to their low cost and availability.

About 0.001 to about 0.1 wt % of a corrosion inhibitor can be included in the mixtures to prevent the mixtures from attacking various metals with which it comes into contact. Examples of corrosion inhibitors include amines, such as ethyl morpholine and methyl morpholine. Other examples of corrosion inhibitors include acetates, glycol ethers, and imidazoles. The preferred corrosion inhibitor is ethyl morpholine because of its good performance and availability.

Because OCT has a pungent odor, it may be desirable to include about 0.01 to about 0.1 wt % of an odor mask in the mixtures to hide its malodorous aroma. Most odor masks are sold as propriety compounds. "Sweet Mask," a proprietary odorant of an ester base sold by Alpine Fragrances, is the preferred odor mask because it masks the odor of OCT at a low concentration.

The following examples further illustrate this invention.

EXAMPLE 1—Comparative

Figure 2:
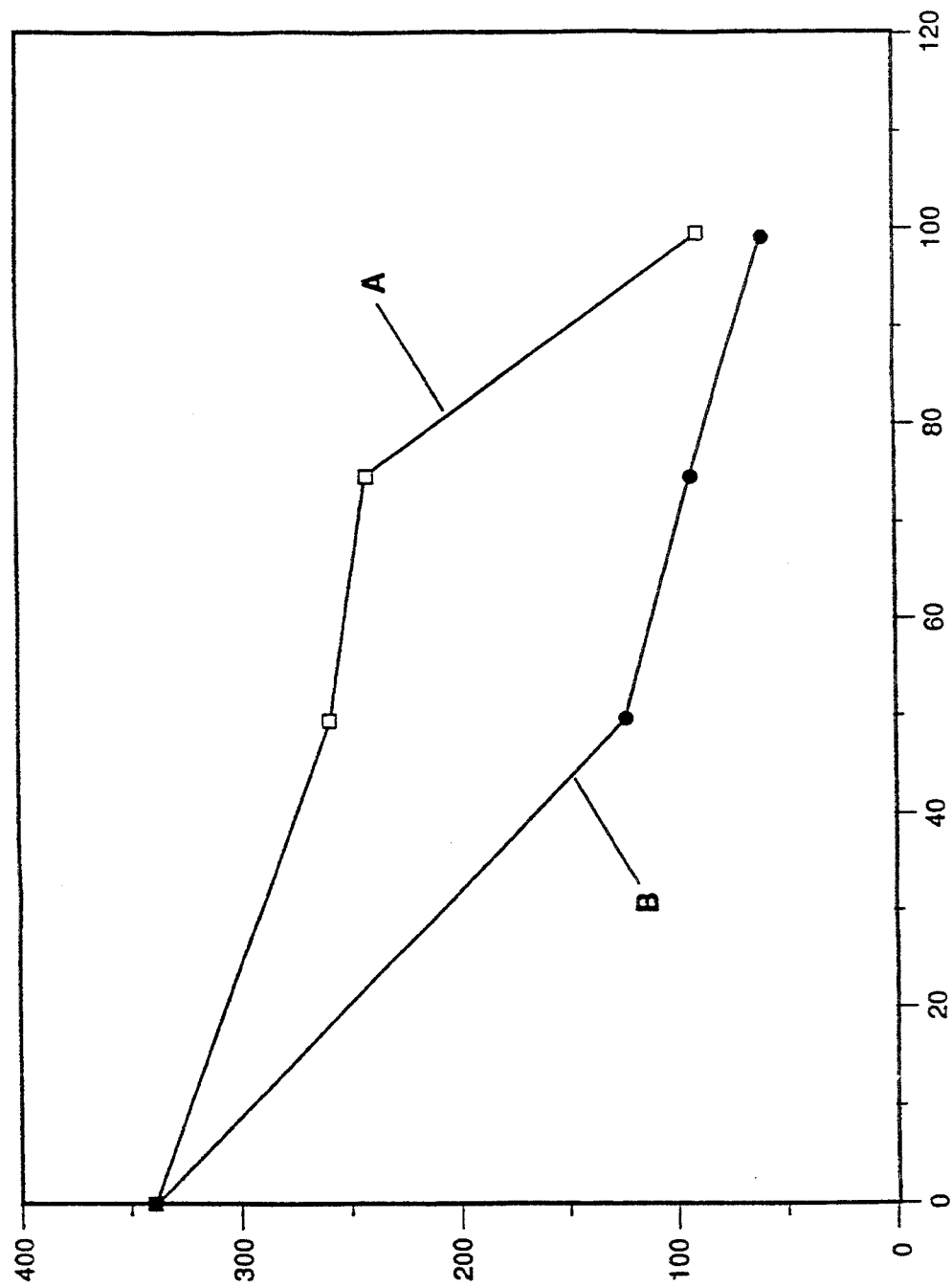
FIG. 2 is a graph where the abscissa is the volume percent of PCBTF (line A) or PERC (line B) mixed with mineral spirits and the ordinate is the evaporation time in seconds. Both graphs are further explained in Example 1.

Various mixtures were prepared of PCBTF with OCT and of PERC with OCT. The evaporation time of the mixtures was determined using ASTM Test D-1901-85, "Standard Test Method For Relative Evaporation Time Of Halogenated Organic Solvents And Their Admixtures." In this test, an aluminum plate having a scribe line 5 inches from one edge is inclined at an angle 60° with the scribe line horizontal. Ten mL of the solvent mixture is poured above the scribe line and the time required for the mixture to run from the scribe line to the bottom of the plate is measured. That measurement is then normalized against a butylacetate standard tested on the same plate at about the same time. The results of this test are given in FIG. 1. In FIG. 1, line A is for mixtures of PCBTF with OCT and line B is for mixtures of PERC with OCT. FIG. 1 shows that 100% PERC evaporates very fast (about 50 seconds) while 100% PCBTF requires almost twice as long (about 100 seconds). Thus, one would expect mixtures of PERC with OCT to evaporate much faster than mixtures of PCBTF with OCT. Indeed, FIG. 2 shows that when ASTM Test D-1901-85 was performed with mixtures of PERC and mineral spirits (i.e., branched chain $C_{12}$-$C_{14}$ hydrocarbons, which evaporate slowly) and mixtures of PCBTF and mineral spirits, the mixtures containing PERC (line B) did evaporate faster than the mixture containing PCBTF (line A), as expected. However, surprisingly, that is not what happened when mixtures of PCBTF and OCT were compared with mixtures of PERC and OCT. As the data in FIG. 1 shows, when the amount of PERC fell below about 74 volume percent in the PERC-OCT mixture, that mixture evaporated slower than did a comparable mixture of PCBTF with OCT.

EXAMPLE 2

A mixture of 20 volume percent PCBTF, 50 volume percent OCT, and 30 volume percent PERC ("253"), and a second mixture of 30 volume percent PCBTF, 20 volume percent OCT, and 50 volume percent PERC ("325") were prepared. Three grams of a polymeric substance was added every 24 hours to a 25 ml sample of each solvent mixture and to pure PCBTF and pure OCT. These samples were observed to determine whether or not the polymeric substances dissolved in the solvent. When no further polymeric substance would dissolve in the solvent, additional solvent was added until solution occurred to determine more precisely the total percent of the polymeric substance that could be dissolved in the mixture. The following table gives the results.

| Type Of Resin | 253 | 325 | PCBTF | OCT |
| --- | --- | --- | --- | --- |
| Polybutene | >70% | >70% | >70% | >70% |
| Epoxy | 50% | 56% | <3% | 65% |
| Phenolic Resin | 58% | 54% | 53% | 65% |
| Polyterpene | 65% | 64% | 58% | 70% |
| Phthalate | 36% | 40% | 31% | <40% |
| Ester (Polymer) | | | | |
| Glycerol Rosin | 67% | 67% | 60% | 75% |
| Acrylate Copolymer | >70% | >70% | >70% | >70% |
| Styrene Rubber | 38% | 30% | 32% | 30% |

The above table shows that the 253 and 325 compositions of this invention are nearly as good as OCT alone in dissolving the polymeric substances tested.

EXAMPLE 3

Various properties of the solvent mixtures prepared in Example 2 were tested and compared with PCBTF, OCT, and PERC. The following table gives the results. In the table, "550" is 50 volume % PCBTF, 50 volume % OCT, and 0 volume % PERC, and "73" is 70 volume % OCT and 30 volume % PERC.

| Properties | 253 | 550 | 325 | PCBTF | OCT | PERC | 73 |
| --- | --- | --- | --- | --- | --- | --- | --- |
| Evaporation Time, Sec | 138 | 116 | 82 | 89 | 164 | 53 | 134 |
| Flash Point, °F. | NFTB[1] | 113 | NFTB[1] | 109 | 123 | None | NFTB |
| Sp. Gr. @25° C. | 1.295 | 1.200 | 1.426 | 1.338 | 1.079 | 1.620 | 1.246 |
| Lbs/Gal | 10.81 | 10.02 | 11.91 | 11.17 | 9.00 | 13.5 | 10.40 |
| Kauri Butanol[2] | 109 | 92 | 100 | 64 | 110 | 90 | 110 |

[1] no flash to boiling
[2] ASTM Test No. D1133-86, "Standard Test Method For Kauri-Butanol Value Of Hydrocarbon Solvents." The Kauri-Butanol test measures ability of the solvent to dissolve Kauri gum compared to butanol.

The above table shows that PCBTF is a poor solvent for Kauri gum while OCT, 73, and 253 are good solvents. The table also shows that 253 and 325 are nonflammable while 550, PCBTF, and OCT are flammable. 325 evaporates rapidly but 253 is a better solvent.

EXAMPLE 4

Figure 3:
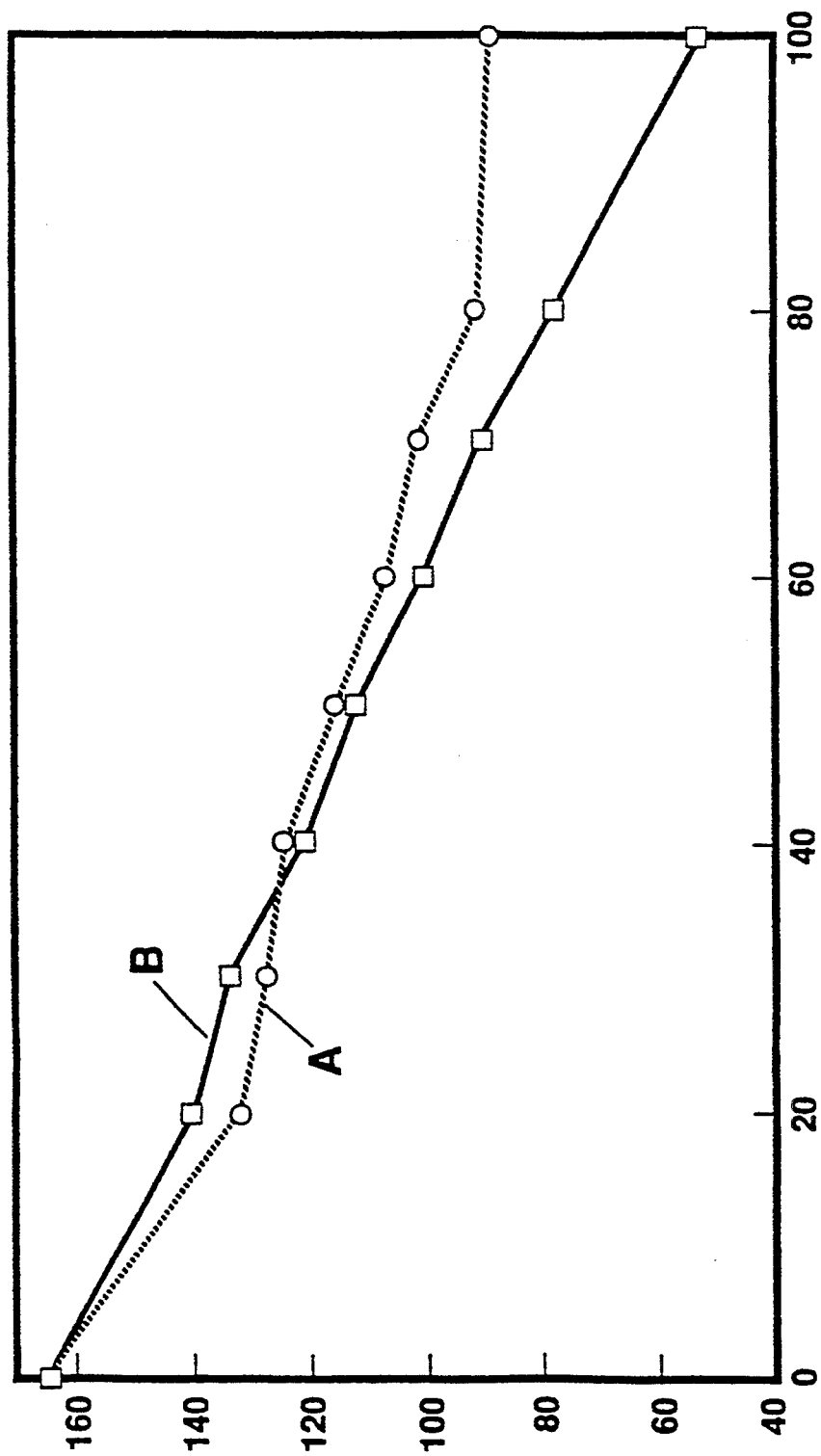
FIG. 3 is a graph where the abscissa is the volume percent of PCBTF (line A) or PERC (line B) mixed with OCT and the ordinate is the evaporation time in seconds. (See Example 4.)

Example 1 was repeated and the evaporation rates of blends or orthochlorotoluene (OCT) and parachlorobenzotrifluoride (PCBTF) were again compared to OCT and perchloroethylene (PERC). Nine data points were obtained at each mixture ratio. FIG. 3 is a graph that summarizes the results and the table that follows gives the raw data, the averages, and the standard deviations. A statistical analysis of the results showed that at a 98% confidence level using the student t distribution the maximum error at 50% and 60% PCBTF exceeded the differences in the average values at 50 and 60%, respectively. Therefore, the data cannot exclude a crossing of the lines in the graph of FIG. 3 at a point over 60% PCBTF. The data shows that mixtures of OCT and PERC evaporated at slower rates than did mixtures of OCT and PCBTF, even though PERC evaporates about twice as fast as PCBTF. The explanation for this phenomenon is not known.

| Evaporation Rates | | | | | | | | | | | |
|---|---|---|---|---|---|---|---|---|---|---|---|
| | Rate, Seconds | | | | | | | | | | |
| | T1 | T2 | T3 | T4 | T5 | T6 | T7 | T8 | T9 | AVG | Std. De |
| Solvent System | | | | | | | | | | | |
| 100% OCT | 165 | 164 | 166 | 164 | 163 | 164 | 165 | 164 | 164 | 164.4 | 0.98 |
| 20% PERC/80% OCT | 141 | 141 | 142 | 140 | 138 | 139 | 138 | 140 | 141 | 139.9 | 1.57 |
| 30% PERC/70% OCT | 131 | 135 | 135 | 135 | 136 | 135 | 133 | 133 | 134 | 134.1 | 1.64 |
| 40% PERC/60% OCT | 122 | 121 | 119 | 122 | 122 | 123 | 123 | 123 | 122 | 121.9 | 1.36 |
| 50% PERC/50% OCT | 113 | 113 | 113 | 114 | 113 | 111 | 114 | 112 | 112 | 112.8 | 1.04 |
| 60% PERC/40% OCT | 102 | 102 | 100 | 102 | 103 | 100 | 101 | 101 | 101 | 101.4 | 1.06 |
| 70% PERC/30% OCT | 90 | 90 | 92 | 92 | 91 | 91 | 92 | 91 | 91 | 91 | 1.05 |
| 80% PERC/20% OCT | 78 | 76 | 78 | 78 | 79 | 78 | 78 | 79 | 78 | 78 | 0.93 |
| 100% PERC | 53 | 52 | 53 | 53 | 51 | 52 | 52 | 54 | 54 | 52.8 | 1.04 |
| 20% PCBTF/80% OCT | 134 | 132 | 130 | 131 | 132 | 135 | 134 | 134 | 132 | 132.7 | 1.75 |
| 30% PCBTF/70% OCT | 128 | 128 | 132 | 124 | 129 | 128 | 131 | 125 | 128 | 128.1 | 2.7 |
| 40% PCBTF/60% OCT | 122 | 124 | 128 | 123 | 122 | 126 | 129 | 124 | 124 | 124.8 | 2.7 |
| 50% PCBTF/50% OCT | 117 | 115 | 115 | 116 | 119 | 114 | 114 | 114 | 116 | 115.7 | 1.67 |
| 60% PCBTF/40% OCT | 106 | 110 | 109 | 106 | 106 | 106 | 108 | 109 | 108 | 107.5 | 1.7 |
| 70% PCBTF/30% OCT | 104 | 103 | 102 | 103 | 102 | 103 | 102 | 102 | 99 | 102 | 1.31 |
| 80% PCBTF/20% OCT | 94 | 92 | 91 | 93 | 91 | 93 | 89 | 93 | 91 | 91.7 | 1.58 |
| 100% PCBTF | 90 | 91 | 89 | 90 | 87 | 86 | 86 | 90 | 89 | 89 | 1.69 |

EXAMPLE 5—Comparative

An attempt was made to form a solvent mixture by adding tetrafluoropropanol to 30 volume % PERC 70 volume % OCT, but the tetrafluoropropanol was not soluble. Therefore, mixtures containing tetrafluoropropanol would not be acceptable for the purposes of this invention.

Since mixtures of OCT and PCBTF have a flashpoint near the flashpoint of tetrafluoropropanol, and tetrafluoropropanol is not soluble in mixtures within the scope of the invention (which do not have flashpoints), 20 volume % tetrafluoropropanol was added to 3,4-dichlorobenzotrifluoride, which lowered the flashpoint from 170° F. to 113° F. That is not acceptable because Department of Transportation regulation HM181 requires a minimum flashpoint of 140° F. in order for a fluid to be considered to be non-flammable.

EXAMPLE 6—Comparative

Two compositions were prepared by adding 10 wt % benzoic acid or 10 wt % dodecyl benzene sulfonic acid to a 50/50 volume % mixture of OCT and PCBTF. An attempt was made to determine the evaporation rate of these two compositions, but this could not be done because as the OCT and PCBTF evaporated the benzoic acid and dodecyl benzene sulfonic acid precipitated, leaving a heavy and unacceptable residue.

An attempt was made to clean parts with a composition of 35 volume % OCT, 35 volume % PCBTF, 10% tetrafluoropropanol and 20 volume % benzoic acid or dodecyl benzene sulfonic acid, but that was also unsuccessful because a residue of acid was left on the parts.

The following mixtures were prepared.

1. 30 volume % PCBTF 70 volume % OCT
2. 30 volume % PCBTF 70 volume % OCT with 15 g (10 wt %) benzoic acid
3. 30 volume % PCBTF 70 volume % OCT with 15 g (10 wt %) dodecylbenzenesulfonic acid.

Precleaned strips of steel, aluminum and copper were weighed then placed in three flasks, each containing 150 ml of one of the solutions and 0.2 wt % water. The solutions were refluxed (at about 140° F.) for 72 hours. The strips were removed, gently recleaned, and reweighed. The following table gives the results:

| Strip | Mixture | % Remaining | Comments |
|---|---|---|---|
| Steel | 1 | 99.9 | Strip looked good - No visible change |
| Aluminum | 1 | 99.9 | Strip looked good - No visible change |
| Copper | 1 | 96.1 | Slight discoloration in spots (before cleaning) |
| Steel | 2 | 38.8 | Corrosion over entire strip |
| Aluminum | 2 | 95.1 | Corrosion in spots on the strip |
| Copper | 2 | 0 | There was a heavy green sludge in the flask |
| Steel | 3 | 0 | There was a heavy sludge in the flask |
| Aluminum | 3 | 54.7 | Corrosion over entire strip |
| Copper | 3 | 100.6 | Copper strip was covered with a dull film |

Mixture 1 was a clear light brown. The Mixture 2 was a cloudy dark brown, with a heavy dark green sludge on the bottom. Mixture 3 was a cloudy dark yellow, with a heavy yellow sludge on the bottom.

EXAMPLE 7

Figure 4:
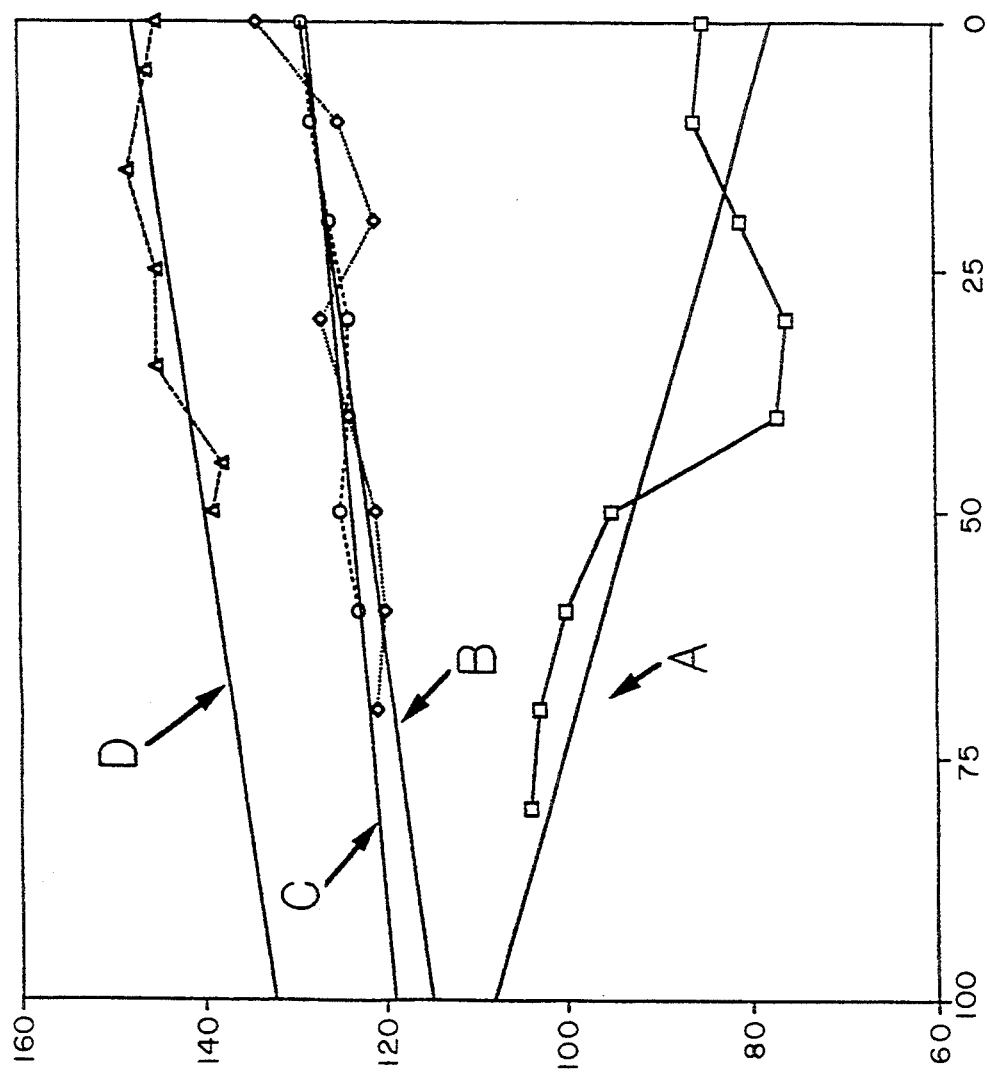
FIG. 4 is a graph showing the effect on evaporation time of replacing PCBTF with PERC in mixtures containing 20, 30, 40, and 50 volume percent OCT. (See Example 7.)

Example 1 was repeated using mixtures of 20, 30, 40, and 50 volume % OCT, where the remainder of the mixture was all PCBTF, then 10% of the PCBTF replaced by PERC, and so on down to all PERC. Three samples of each mixture were made and tested. FIG. 4 is a graph giving the results of these experiments. In FIG. 4, the abscissa is the volume % PCBTF, the ordinate is the evaporation time in seconds, curve A is 20 volume % OCT, curve B is 30 volume % OCT, curve C is 40 volume % OCT, and curve D is 50 volume % OCT. FIG. 4 shows that even though PERC evaporates faster than PCBTF (see 100% in FIG. 1), as PCBTF was replaced by PERC in these compositions the evaporation rate increased.

I claim:

1. A mixture consisting essentially of
   (1) about 10 to about 60 volume % monochlorobenzotrifluoride;
   (2) about 30 to about 60 volume % monochlorotoluene; and
   (3) about 20 to about 60 volume % perchloroethylene.

2. A mixture according to claim 1 wherein said monochlorotoluene is orthochlorotoluene.

3. A mixture according to claim 1 wherein said monochlorobenzotrifluoride is parachlorobenzotrifluoride.

4. A mixture according to claim 1 comprising 20 volume % parachlorobenzotrifluoride, 50 volume % orthochlorotoluene, and 30 volume % perchloroethylene.

5. A mixture according to claim 1 which includes
   (a) about 0.01 to about 1.0 weight % of a stabilizer;
   (b) about 0.0005 to about 0.1 weight % of an antioxidant and;
   (c) about 0.001 to about 0.1 weight % of a corrosion inhibitor.

6. A mixture according to claim 5 wherein said stabilizer is allyl glycidyl ether, said anti-oxidant is t-amyl phenol, and said corrosion inhibitor is N-ethyl morpholine.

7. A mixture comprising about 10 to about 30 volume % monochlorobenzotrifluoride, about 40 to about 60 volume % monochlorotoluene, and about 30 to about 50 volume % perchloroethylene.

8. A mixture according to claim 7 wherein said monochlorotoluene is orthochlorotoluene.

9. A mixture according to claim 7 wherein said monochlorobenzotrifluoride is parachlorobenzotrifluoride.

10. A mixture according to claim 7 which includes
    (a) about 0.01 to about 1.0 weight % of a stabilizer;
    (b) about 0.0005 to about 0.1 weight % of an antioxidant;
    (c) about 0.001 to about 0.1 weight % of a corrosion inhibitor; and
    (d) about 0.01 to about 0.1 weight % of an odor mask.

11. A mixture according to claim 10 wherein said stabilizer is allyl glycidyl ether, said antioxidant is t-amyl phenol, and said corrosion inhibitor is N-ethyl morpholine.

12. A mixture consisting essentially of
    (1) about 20 to about 50 volume % monochlorobenzotrifluoride;
    (2) about 30 to about 60 volume % monochlorotoluene; and
    (3) about 20 to about 50 volume % perchloroethylene.

13. A mixture according to claim 12 wherein said monochlorotoluene is orthochlorotoluene.

14. A mixture according to claim 12 wherein said monochlorobenzotrifluoride is parachlorobenzotrifluoride.

15. A mixture according to claim 12 which includes
    (a) about 0.01 to about 1.0 weight % of a stabilizer;
    (b) about 0.0005 to about 0.1 weight % of an antioxidant and;
    (c) about 0.001 to about 0.1 weight % of a corrosion inhibitor.

16. A mixture according to claim 15 wherein said stabilizer is allyl glycidyl ether, said anti-oxidant is t-amyl phenol, and said corrosion inhibitor is N-ethyl morpholine.

* * * * *